UNITED STATES PATENT OFFICE.

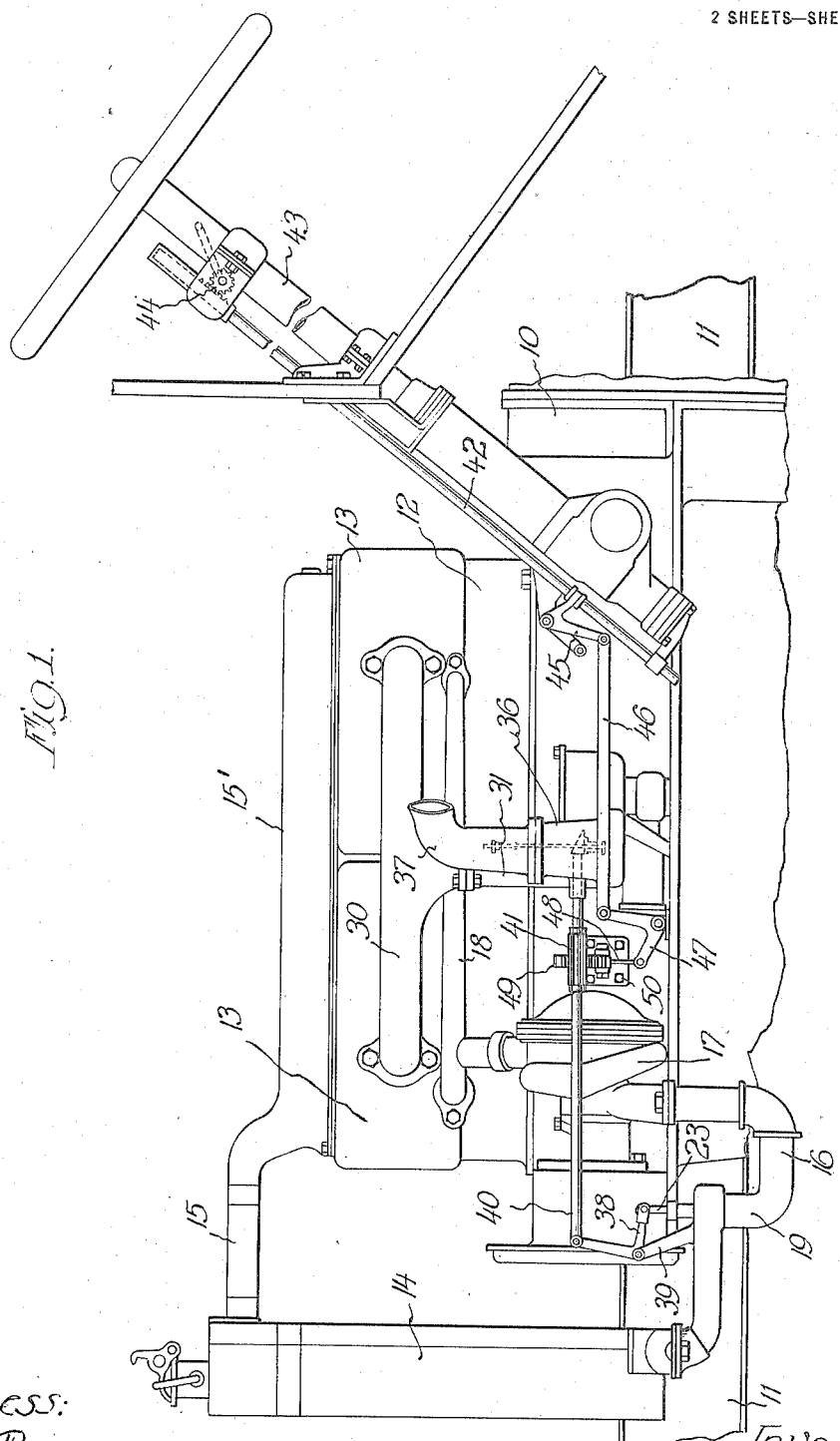

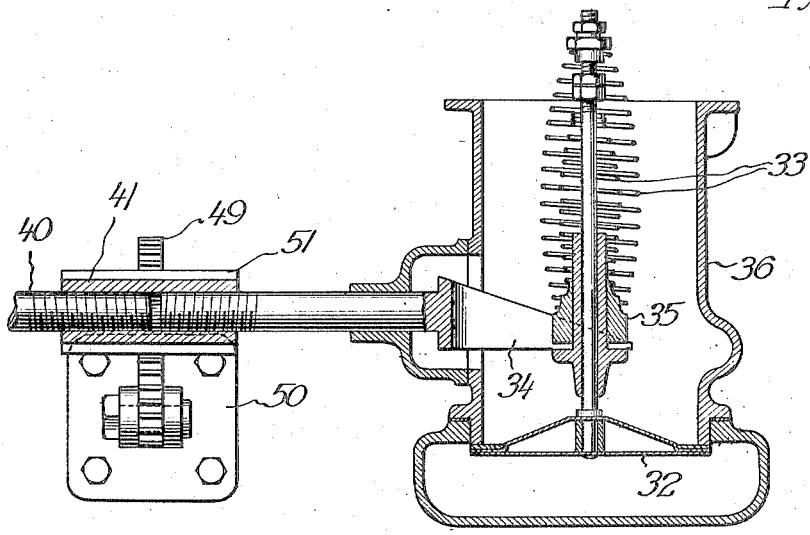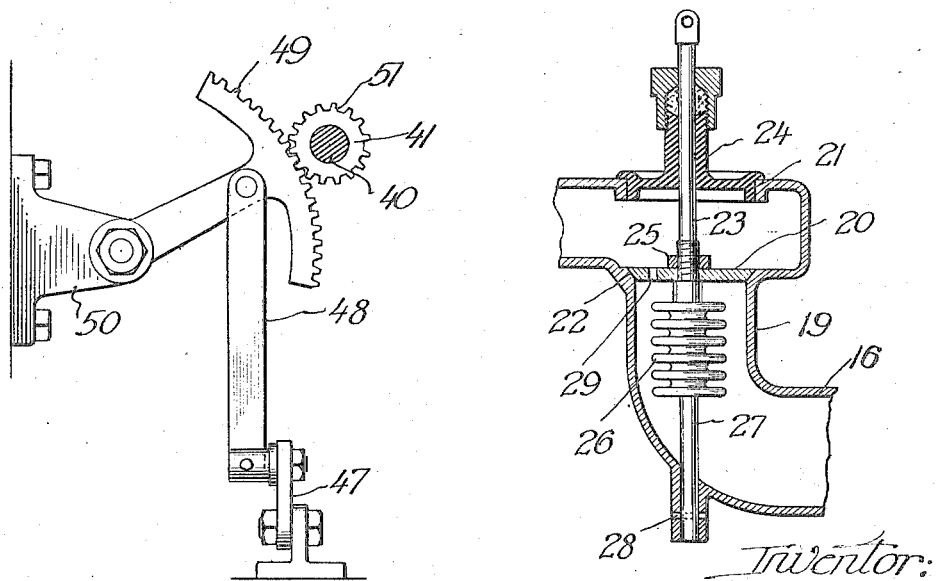

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

HYDROCARBON-MOTOR.

1,321,865.      Specification of Letters Patent.      Patented Nov. 18, 1919.

Application filed September 10, 1915. Serial No. 49,926.

*To all whom it may concern:*

Be it known that I, JESSE G. VINCENT, a citizen of the United States, and resident of Detroit, Wayne county, State of Michigan, have invented certain new and useful Improvements in Hydrocarbon - Motors, of which the following is a specification.

This invention relates to hydrocarbon motors, and particularly to mixture forming and controlling means therefor.

One of the objects of the present invention is to provide means for automatically adjusting the proportion of air and gas passing to the motor.

Another object is to provide a thermostat for the air valve or other mixture control device on the carbureter and manually controlled means for varying the relative arrangement of the thermostat and the device.

Another object is to provide a single thermostat for controlling the action both of the cooling system and of the carbureter.

These and other objects of the invention will appear from the following description taken in connection with the drawings which form a part hereof, and in which:—

Figure 1 is a side elevation of a hydrocarbon motor, mounted in the forward part of a motor vehicle and embodying the invention;

Fig. 2 is an enlarged section through the carbureter air valve;

Fig. 3 is an enlarged section through a valve chamber of the water circulation system of the motor, showing the thermostat; and Fig. 4 is a detail view of the adjusting mechanism.

Referring to the drawings, 10 represents a hydrocarbon motor mounted upon the forward part of a motor vehicle frame 11. The motor cylinders 12 are shown in two castings and are water jacketed as at 13. and a radiator 14 is suitably supported adjacent the motor and is connected to the cylinder water jackets by piping 15 and 16, the piping 15 leading from the outlet manifold 15' at the tops of the cylinder jackets to the upper part of the radiator, and the piping 16 leading through a pump 17, driven by the motor, and manifold 18 to the lower part of the jackets. This piping 16 also includes a valve chamber or casing 19, shown in section in Fig. 3, in which is a valve 20 adapted to control the action of the water circulation system. The valve is assembled through an opening 21 in the casing directly above the valve seat 22 and the valve stem 23 is guided in a cap 24 which closes the opening. The valve is secured to its stem as by a nut 25, and a thermostat 26 is also connected or secured to the valve and arranged in the chamber 19. The thermostat 26 may be of any suitable and well known construction and as shown it consists of a sealed expansible metal tube containing liquid such as alcohol that will expand with heat and contract with cold. Its lower end is retained against movement by the stem 27 being connected to the wall of the casing as at 28, so that all expansion of the thermostat is upwardly carrying with it the valve 20. Said valve is provided with a by-pass opening 29 through which a small amount of water is adapted to pass to thus provide a slow circulation through the system. It will be understood that if the motor is cold when started the thermostat will be contracted and the valve 20 will be seated as shown in Fig. 3 and as the motor gets warmer the thermostat will expand and open the valve to permit a full circulation of water through the radiator. Thus the action is automatic.

In Fig. 1, 30 represents the motor intake manifold which is supplied by a carbureter 31 of usual form having means for regulating or varying the relative proportions of air and gas composing the mixture passing to the motor. In the carbureter shown the mixture is varied by means of an auxiliary air valve 32, which is of the puppet valve type, closed by springs 33 the tension of which may be adjusted by a wedge 34 acting under a block 35 which slides on the valve stem. A housing 36 surrounds and protects the valve and is provided with an inlet pipe 37 of suitable form.

When a cold motor is started it requires a much richer mixture, that is, a larger proportion of gas to air, to fire properly than when it is hot, and with the carbureter shown therefore, the wedge 34 should be well inserted under the block 35 to increase the tension on the valve springs when the motor is to be started. In the present invention this is automatically accomplished by connecting the wedge 34 to the valve 20 or thermostat 26, so that the wedge will be in when the thermostat is contracted and will be pulled out to lessen the tension on the valve 32 as the thermostat expands with the heat in the water circulation system. The wedge is shown in dotted lines in Fig. 1 in valve closing position and in Fig. 2 it is withdrawn to lessen the tension on the springs 33. As shown the connection from the thermostat to the wedge 34 is through the valve stem 23, a bell crank 38 supported by a bracket 39, and a rod 40. Said rod is in two parts connected by a sleeve 41 into which the parts are threaded, one by a right hand thread, and the other by a left hand thread as shown in Fig. 2. Thus the length of the rod may be changed to adjust the position of the wedge 34 relative to the thermostat to get the correct adjustment of the springs 33. This adjustment is adapted to be manually accomplished by the operator, when the motor is running if desired. A control rod 42 is mounted on the vehicle steering column 43 to be operated by a rack and pinion device 44 within easy reach of the operator. The lower end of the rod is connected through bell crank 45, link 46, bell crank 47, and link 48, with a rack or segment 49 suitably pivoted to a bracket 50 so that it may gear with teeth 51 on the sleeve 41 above described. Said teeth 51 run the full length of the sleeve so that the rod 40 may be freely operated by the thermostat. However, in whatever position the thermostat may hold the rod 40 the latter's length may be adjusted by the operator by rotating the sleeve 41 through the mechanism above described for the purpose of getting a fine adjustment of the valve 34.

It is believed that the full operation of the device will be clearly understood from the above detailed description. It will be understood also that while but one form of the invention is herein shown and described, the invention is not limited to the details shown, and it will be apparent that changes may be made without departing from the spirit or scope of the invention.

Having thus described my invention, what I claim and desire to secure by Letters Patent is:—

1. In a hydrocarbon motor, in combination, a carbureter having a device for varying the richness of the mixture, a thermostat, connections running from said thermostat to said device to adjust the latter automatically, said connections including two threaded rod sections, a turnbuckle joining said sections, and gearing for turning said turnbuckle to effect adjustment of said connecting rod sections, and a manually operative handle connected to said gearing for operating said turnbuckle and to adjust the distance between the rod sections and located at a point remote from the turnbuckle.

2. In a hydrocarbon motor, in combination, a carbureter, a valve for controlling the admission of one of the ingredients of combustion to the carbureter, a spring arranged to act on said valve, a thermostat, connections running from said thermostat to said spring to vary automatically the applied force of the latter, and manually operative means, including one of said connections, arranged to vary the applied force of said spring.

3. In a hydrocarbon motor, in combination, the water circulation system thereof, a carbureter and a thermostat connected to control the action of both said system and said carbureter.

4. In a hydrocarbon motor, in combination, the water circulation and carbureter systems thereof, and a thermostat connected to control the action of both said systems.

5. In a hydrocarbon motor in combination, a carbureter having an inlet valve, a spring arranged to act on said valve, a movable wedge and a wedge-shoe arranged to vary the applied force of said spring, means arranged to guide said wedge, a thermostat, connections running from said thermostat to said wedge to adjust the latter automatically, and means operable otherwise than by said thermostat to adjust the wedge relatively to the thermostat.

6. In a hydrocarbon motor, in combination, a carbureter having means for adjusting the richness of the mixture, a cooling system for the motor, a valve in the cooling system, and connections from said valve to said means.

7. In a hydrocarbon motor, in combination, a carbureter having means for adjusting the richness of the mixture, a cooling system for the motor, a valve in the cooling system, connections from said valve to said means, and manually operated means for adjusting said connections.

8. In a hydrocarbon motor, in combination, a carbureter having means for adjusting the richness of the mixture, a cooling system for the motor, a thermostatically controlled valve in said cooling system, and connections from said valve to said means.

In testimony whereof I affix my signature.

JESSE G. VINCENT.